United States Patent [19]

Nagy

[11] Patent Number: 5,163,054
[45] Date of Patent: Nov. 10, 1992

[54] METHOD FOR DATA TRANSMISSION USING A MODIFIED HIGH LEVEL DATA LINK CONTROL PROTOCAL

[75] Inventor: Michael E. Nagy, Tampa, Fla.

[73] Assignee: International Business Machines Corp., Armonk, N.Y.

[21] Appl. No.: 636,794

[22] Filed: Dec. 31, 1990

[51] Int. Cl.$^5$ .......................... G08C 25/02; H04L 1/18
[52] U.S. Cl. .................................. 371/32; 364/284.4; 364/283.3
[58] Field of Search .......................... 371/32, 33, 20.1; 364/284.4, 283.3

[56] References Cited

U.S. PATENT DOCUMENTS

| | | | |
|---|---|---|---|
| 4,422,171 | 12/1983 | Wortley et al. | 371/32 |
| 4,439,859 | 3/1984 | Donnan | 371/32 |
| 4,551,834 | 11/1985 | Liénard | 371/22 |
| 4,601,035 | 7/1986 | Marzec et al. | 371/32 |
| 4,829,524 | 5/1989 | Yoshida | 371/32 |

OTHER PUBLICATIONS

"X.25 Conformance Testing–a tutorial" Sherif et al. IEEE 1986, pp. 161∝27.

"Computer networks" Second Edition, A. S. Tananbaum 1988, pp. 576–587 and pp. 219–225.
"A Distributed interoffice mail system" IEEE 1985 by Ueda et al., pp. 106–116.

*Primary Examiner*—Robert W. Beausoliel
*Assistant Examiner*—Phung My Chung
*Attorney, Agent, or Firm*—David A. Mims, Jr.

[57] ABSTRACT

A method of early data frame release using a modified High-level Data Link Control (HDLC) protocol. A destination link station delivers received data frames immediately upon receipt. The data frames are directed to an intelligent application layer with sufficient information to permit resequencing the out-of-order data frames to maintain data synchronization. A transmitter maintains and assigns sequential sequence numbers to each of a plurality of data frames in a radix cycle from zero to seven and back to zero. A transmit toggle bit enables data frame receipt confirmation with the transmitter altering the transmit toggle bit each time the same sequence number is reused. Each data frame must be confirmed before a sequence number can be made available for reuse.

9 Claims, 3 Drawing Sheets

Data Frame Format

Null Frame Format

Data Transparency Encoding Transformations

Address Byte Format

Control Byte Format

METHOD FOR DATA TRANSMISSION USING A MODIFIED HIGH LEVEL DATA LINK CONTROL PROTOCAL

CROSS REFERENCE TO RELATED APPLICATION

This application is related in subject matter to the following applications filed concurrently herewith and assigned to a common assignee:

Application Ser. No. 636,795 filed by Nagy entitled "Improved Error Recovery Protocol".

Application Ser. No. 636,793 filed by Nagy entitled "Improved Data Packet Format".

The foregoing co-pending applications are incorporated herein by reference.

FIELD OF THE INVENTION

This invention relates to a method of transmitting data frames in a data processing system, and more particularly, to the immediate release of error-free data frames received over an asynchronous link to their destinations while simultaneously identifying and selectively retransmitting only the data frames having errors.

BACKGROUND OF THE INVENTION

The need for economical high speed transmissions of data over communication links continues to increase. Transmission efficiency falls and costs rise drastically when data is required to be retransmitted. The possibility of having to retransmit data increases in noisy environments, such as transmissions over telephone lines using modems. Under the popular Synchronous Data Link Control (SDLC) protocol, when a data frame in a sequence of frames is lost, the protocol recovery rules force the re-transmission not only of the frame which was damaged, but all subsequent frames as well.

A better solution in the form of the High-Level Data Link Control (HDLC) protocol stipulated by the IOC (International Organization for Standardization) has been used to ease the problem. In the HDLC protocol, the REJ (Reject) scheme and the SREJ (Selective Reject) scheme are stipulated as re-transmission schemes to be used in the case where transmitted frames are in error and have not properly reached the receiver.

The REJ scheme is representative of the so-called "Go-Back-N Automatic Repeat Request scheme." The REJ scheme works in the following manner. When a receiver detects the omission of a frame because of the reception of an out of sequence frame, it sends back a signal REJn (where n represents the number of the erroneous frame) indicating a re-transmission request. The sending side retransmits the erroneous frame and also sends a series of sent frames succeeding thereto. The REJ scheme has the advantage that a small number of buffers suffice on both the sending and receiving sides.

According to the SREJ scheme, only erroneous frames are retransmitted. Therefore, no frame is transferred wastefully. However, two or more signals SREJ cannot be simultaneously sent back according to provisions of the HDLC protocol. Therefore, the SREJ capability experiences appreciable degradation in especially noisy conditions where multiple errors occur in a single burst of frames. Under such conditions, the SREJ capability reverts to the SDLC re-transmission rule, namely, the erroneous frame as well as all subsequent frames. Large numbers of buffers are also required on both the sending and receiving sides. These buffers serve to hold the error-free frames until the error frame is received and is properly sequenced.

HDLC frames must be released from the receiving link station in the exact order in which they are delivered to the transmitting link station. In noisy environments where re-transmissions are taking place, this means that frames which have been correctly received cannot be released to their destinations until other unrelated packets have been retransmitted without error. The problem revolves around a fundamental provision of the protocol, namely, that HDLC assumes responsibility for re-sequencing the frames, to maintain data synchronization. The provision applies regardless of whether the receiver has an intelligent application layer capable of re-sequencing the frames.

Consequently, what is needed is a method of simultaneously identifying and selectively retransmitting a plurality of erroneous data frames received in a single burst of data frames, while releasing error-free data frames immediately to their destinations.

SUMMARY OF THE INVENTION

This invention relates to a method of early data frame release using a modified High-level Data Link Control (HDLC) protocol. A destination link station delivers received data frames immediately upon receipt. The data frames are directed to an intelligent application layer with sufficient information to permit resequencing out-of-order data frames to maintain data synchronization. A transmitter maintains and assigns, using a circular queue, sequential sequence numbers to each of a plurality of data frames in a radix cycle from zero to seven and back to zero. A maximum of seven sequence numbers are permitted to be in use at any one time. A transmit toggle bit is provided for data frame receipt confirmation with the transmitter altering the transmit toggle bit each time the same sequence number is reused. The method requires the confirmation of each data frame to make a sequence number available for reuse. A list of data frame that are not confirmed must be maintained and each new received frame must be checked against the list before releasing a transmit sequence number for reuse.

DETAILED DESCRIPTION

Figure 1:
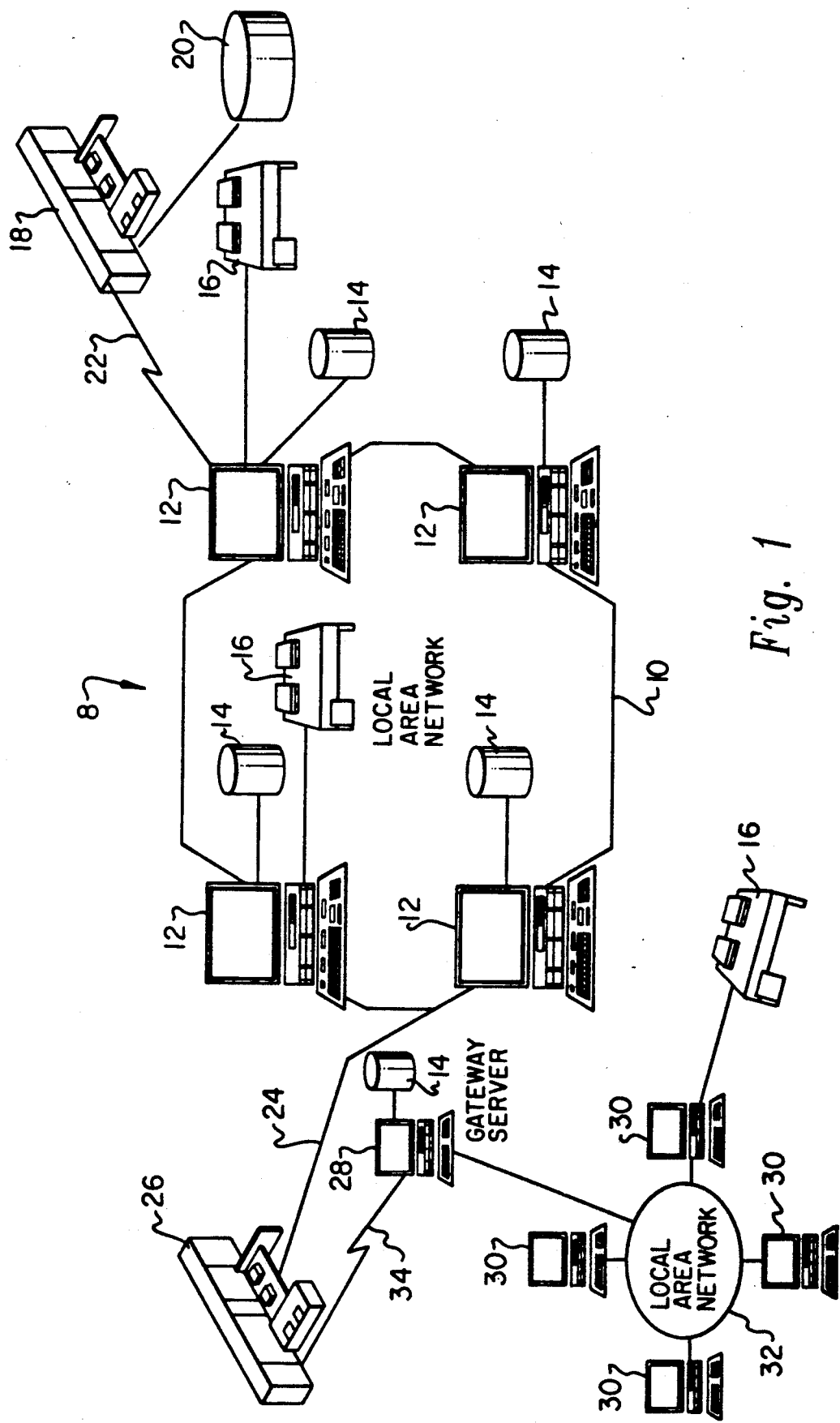
FIG. 1 is a block diagram of a Data Processing System where this invention may be practiced.

With reference now to the figures, and in particular with reference to FIG. 1, there is depicted a pictorial representation of a data processing system 8 which may be utilized to implement the method of this invention. As may be seen, data processing system 8 may include a plurality of networks, such as Local Area Networks (LAN) 10 and 32, each of which preferably includes a plurality of individual computers 12 and 30, respectively Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store applications or other programs which may be periodically accessed by any user within data processing system 8.

Still referring to FIG. 1, it may be seen that data processing network 8 may also include multiple main frame computers, such as main frame computer 18, which may be preferably coupled to LAN 10 by means of communications link 22. The communications link 22 may further include modems (not shown) at each end of the link capable of simultaneous bidirectional data flows. Main frame computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or Interactive Work Station (IWS) which serves to link LAN 32 to LAN 10.

As discussed above with respect to LAN 32 and LAN 10, applications or other programs may be stored within storage device 20 and controlled by main frame computer 18. Of course, those skilled in the art will appreciate that main frame computer 18 may be located a great geographic distance from LAN 10 and similarly LAN 10 may be located a substantial distance from LAN 32.

As indicated, components of the above data processing system may be located substantial distances from each other. High-performance asynchronous (async) links may be required with specific sets of features, similar to those of this invention, to enable efficient transmissions over the communication links. The basic link concepts of this invention are derived from the High-Level Data Link Control (HDLC) protocol. The modifications meet the requirements of a high-performance async link using the limited data rates of low cost async modems. The link protocol of this invention requires very low overhead and allows application data to flow efficiently. On average, this invention adds only five bytes per frame to an application data packet. A packet, as used in this invention, refers to a sequence of binary digits, including data and controls signals, that is transmitted and switched as a composite whole. The data and control signals may also include error control information arranged in a specific format. The term packet is also synonymous with data frame.

At 1200 bits per second (bps), the target packet size is 60 bytes per frame, giving a framing overhead of approximately 8 percent. At 2400 bps the target packet size increase to 120 bytes, reducing the framing overhead to 4 percent. This is a full-duplex protocol, and was selected to be so, in order to lessen or eliminate the delay of the negative acknowledgement of bad frames. In typical synchronous protocols, half-duplex data flow can delay the negative acknowledgement of bad frames by up to six full frame times in a worst case situation.

The full-duplex operation of this invention reduces the negative acknowledgement to a little over one full frame time in a worst case situation. Another positive effect of full-duplex operation, where bidirectional data flow is permitted, is a doubling of the bandwidth of the link by allowing data flow in both directions simultaneously.

Figure 2:
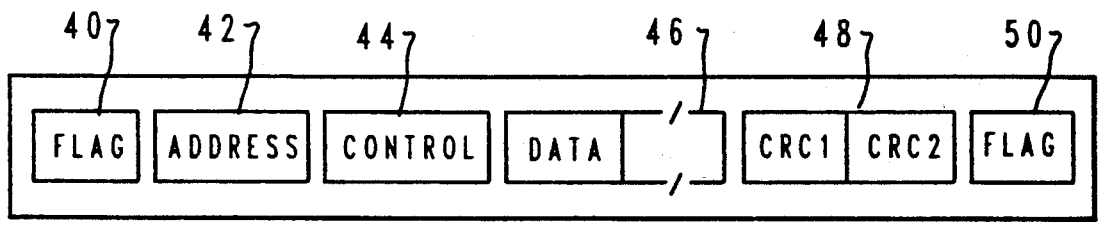
FIG. 2 is the format for a data frame for the modified HDL protocol.

Turning to FIG. 2, the format for a data frame is shown. Two types of frames are defined by this invention—data frame and null frame—to provide for the transport of data packets across the link and for timely acknowledgement of their receipt. Application data will be encapsulated in a data frame consisting of an initial flag byte 40, an address byte 42, a control byte 44, one or more data bytes 46, two frame check sequence (CRC) bytes 48, and a terminal flag byte 50.

The address 42, control 44, data 46 and CRC 48 bytes are subject to a data-transparency transformation and will be expanded to include escape sequences if necessary before being queued to the physical transmitter. Upon receipt, these same bytes are processed to reverse the data-transparency transformation before being examined. Data transparency is achieved by the use of byte stuffing logic. Byte stuffing refers to the final operations necessary to physically transmit a frame. It refers to the addition of the begin/end recognitions indicators, as well as data transparency information. Byte stuffing occurs only after a transmit data packet has been framed, had the CRC calculated and inserted, and has been (optionally) encrypted. Byte stuffing logic first defines an "escape" character. Whenever the escape character flows over the link, it is always the first character of a two character escape sequence. The escape character is used to provide an alternate encoding mechanism for occurrence of the frame begin/end character in normal data and to encode actual occurrences of the escape character itself when they occur in the normal data. The frame start flag 40 is defined to be the eight-bit byte 0×7e. This value is guaranteed not to occur within the frame by the data transparency transformation which is applied to the frame image before it is queued to the physical transmission process. This value is also used for the frame end flag 50. No conflict occurs, and by using the same value for the frame start 40 and end flag 50, it is possible to pack sequential frames end-to-end and allow the end flag 50 of the first frame to double as the start flag 40 of the next frame.

Limiting the number of eight-bit byte values which must be protected by the data transparency transformation, minimizes the reduction of link capacity throughput caused by the expansion of conflicting data bytes into escape sequences. If we assume that the majority of the data flow is highly compressed, and that the compressed data will have an essentially "white" spectrum, the impact of data transparency expansion to avoid the two reserved bytes (the frame flag and the escape flag) should average less than one percent.

Figure 4:
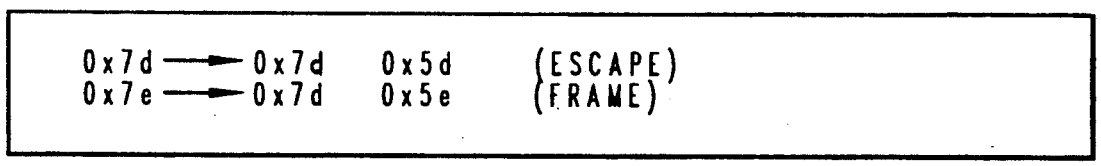
FIG. 4 is the data transparency encoding transformations for the modified HDLC protocol.

The escape flag is defined to be the eight-bit byte 0×7d. On the physical link, this value is guaranteed to be the first byte of a two-byte escape sequence in which the second byte will never be equal to either the escape flag value or the frame start flag 40 value. To achieve data transparency (unrestricted frame data content), escape sequences are substituted for any occurrences of the values 0×7e (the frame start flag 50) or 0×7d (the escape flag itself) in the address 42, control 44, data 46 and frame check sequence fields 48 of data frames. When one of these two special byte values is encountered, the transmitter substitutes an escape flag byte followed by the original byte value exclusive OR'ed with the byte value 0×20. This means transformations will occur as shown in FIG. 4. The receiver reverses the transformations to reconstruct the original byte values in the address 42, control 44, data 46 and frame check sequence 48 fields after the frame is received by the physical transport layer.

The integrity of each frame is statistically guaranteed by a 16-bit CRC 48 frame check sequence which is calculated and inserted in each frame on transmission and checked and deleted from each frame on receipt. Frames which fail the check sequence confirmation calculation are discarded just as through they had never been received. The frame check sequence consists of a two-byte cyclic redundancy check value calculated from the values of the address 42, control 44, and data 46 bytes before the data transparency transformation is performed. The CRC generator polynomial is defined by the 16 bit value 0×1021.

Figure 3:
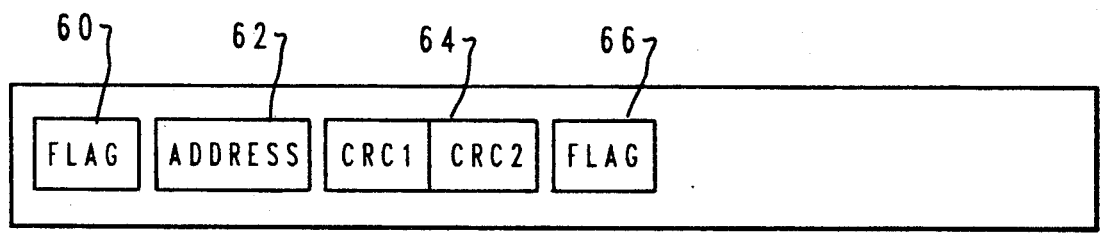
FIG. 3 is the format for a null frame in the modified HDLC protocol.

Turning to FIG. 3, the format for a null frame is shown. Data exchanged between two link stations takes the form of a series of data frames. These frames can be either the data frames as shown in FIG. 2, or the null frame of FIG. 3. A null frame carries no data, unlike the data frame which carries one or more bytes of application data. The link supervisory functions are handled by the exchange of null frames and application data frames.

Figure 5:
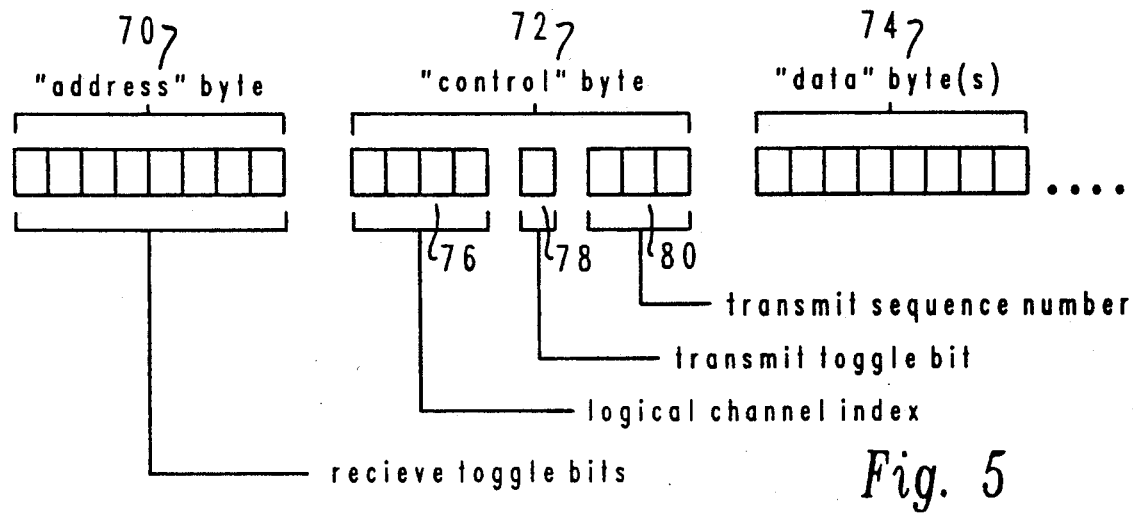
FIG. 5 is an address, control, and data byte for the modified HDLC protocol.

Referring now to FIG. 5, details of the data frame's address byte 70, control byte 72 and data byte 74 will be described. Data frames consist of a sequence of 8-bit bytes, with the bytes transmitted and received using an eight-bit data word with one start bit, one stop bit, and no parity bit.

Figure 6:
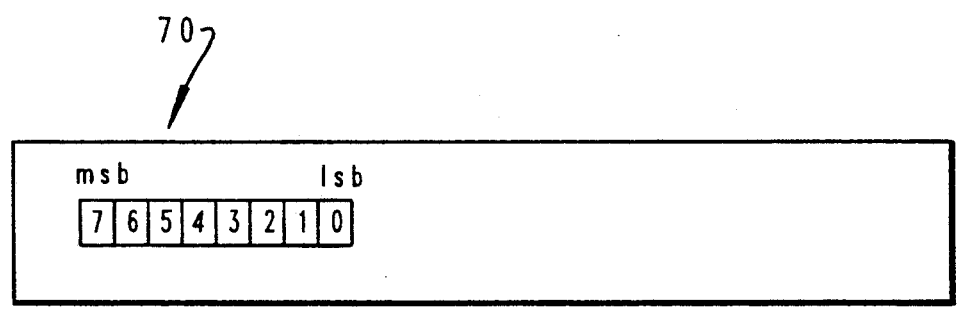
FIG. 6 is the format for an address byte for the modified HDLC protocol.

Every frame contains an address byte 70 which consists of eight individual receive toggle bits. Each receive toggle bit corresponds to one of the eight possible transmit sequence numbers from zero to seven. As shown in FIG. 6, the least significant bit (1 sb) corresponds to transmit sequence number zero and the most significant bit (msb) corresponds to transmit sequence number seven.

Referring again to FIG. 5, whenever a frame is accepted by the receiver, the value of the receive toggle bits in the address byte 70 of the received frame are checked against the status of any unacknowledged transmitted frames. If the value of the appropriate receive toggle bit matches that expected for a particular transmitted frame, then that frame is considered to be acknowledged and the associated transmit sequence number becomes available for reuse.

This invention provides an async link protocol with a selective reject (SREJ) capability similar to that used in the HDLC protocol Under HDLC, a re-transmission of the damages frames occur only when a single error is discovered in a sequence of consecutive frames. This invention improves on the selective reject capability by allowing up to six damaged frames in a sequence of up to seven consecutive frames to be simultaneously identified and selectively retransmitted as necessary.

This invention also minimizes the impact of error transmissions on error recovery. A dynamic frame size adjustment algorithm is employed that decreases the frame size when multiple errors occur. This allows more frames to pass over the link between failures. A positive throughput is thus achieved despite the occurrence of multiple errors. If no errors occur for a period of time, the frame size is allowed to rise back to the optimal values.

The regular HDLC protocol station address supports several types of link topology including multi-drop and ring connections. Because of the operating environment—modems only—this modified HDLC protocol supports only point-to-point topology.

This modified HDLC protocol provides for sixteen independent logical sessions on a single physical link. This is logically supported by a dedicated four-bit field in the data frame header which is used to route packets to specific application queues. Although this function is not strictly part of the link layer, it is efficiently integrated into the link layer and eliminates the need for a separate low-level packet router task.

Referring again to FIG. 5, this invention uses a mechanism similar to that used by SDLC and HDLC to sequence frames. A three-bit transmit sequence number 80 is assigned to each frame. This invention however, never allows more than seven sequentially numbered frames to be unacknowledged at any one time. The transmitter can assure that data will not overrun the receiver and can automatically initiate re-transmissions based on acknowledgements from the receiver.

Figure 7:
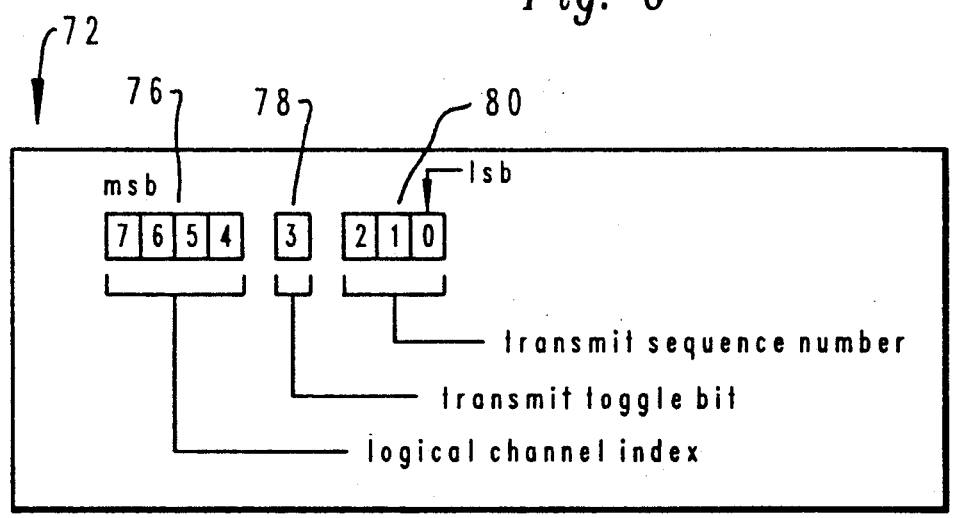
FIG. 7 is the format of the control byte showing the bit significance of the bits composing the byte.

Referring to FIG. 7, frames which carry data include a control byte 72 which contains three distinct fields. The first field is a four-bit logical channel index 76 which is used to route the data to any of sixteen distinct destination queues. The second is a three-bit transmit sequence number 80 field which is used to assure sequential delivery of data packets to target queue in the face of possible transmission errors which might cause physical reception of packets to occur out of the order in which they were originally supplied to the transmitter. The third field is a single-bit transmit toggle bit 78 value which works in conjunction with the transmit sequence number 80 to detect and discard multiple copies of data frames which may be received when an acknowledgement of the first copy is lost due to line noise.

The three-bit transmit sequence number 80 field is used to enforce serialization of data packets as they flow across the link. Under normal (low noise) conditions, packets will be received in the order in which they were scheduled for transmission. When errors occur which cause re-transmissions to occur, it becomes necessary to transmit frames out of order.

As the transmitter schedules data packets for transmission, it assigns sequential sequence numbers in a radix 8 cycle from zero to seven and then back to zero. All eight sequence numbers start out in an available status. A total of no more than seven sequence numbers may be in use at any one time. For the transmitter to schedule a data packet for transmission, the next sequence number must be available and the total number of sequence numbers in use must be six or less.

Once a sequence number has been assigned, it can only be made available again if the receiver has confirmed reception of that sequence number and the sequence number immediately before it is already available. This has the effect of pacing data flow over the link during error recovery.

The transmit toggle 78 bit is inverted by the transmitter each time a sequence number is reused. The receiver confirms receipt of a packet each time its transmit toggle bit 78 is different than the toggle bit of the last packet which carried the same transmit sequence number.

If a packet is received with a transmit toggle bit which matches the last one received on a packet with the same transmit sequence number then the packet is discarded as a duplicate and is not confirmed.

The logical channel index 76 is logically treated as data by the link layer logic until a received packet is released by the link layer for delivery to the application layer. At this time, the value of the channel index 76 is use to index into a table of registered applications to determine the proper target queue for the incoming data.

In summary, this invention permits the release of error-free frames to their destinations immediately upon receipt. Those skilled in the art will know that such a technique is applicable in packet switched environments where higher levels of the interapplication protocol can resequence frames as required. This is the case, for example, in X0.25 networks. This invention provides a method of conveying data frames that will permit an intelligent application layer to reassemble the data frames received out of order. This is achieved by providing a transmitter which assigns sequential sequence numbers to each frame in a radix 8 cycle from zero to seven and back to zero. The protocol limits to a maximum of seven the number of sequence numbers permitted to be in use at any one time. A receiver accepts a frame by setting a corresponding bit in a receive toggle bit array with a value from a transmit toggle bit. The value of the transmit toggle bit is alternated with a particular sequence number each time it is reused to provide a reliable confirmation indication. This alternation is accomplished by considering the transmit toggle bit as the high order bit of a virtual four bit transmit sequence number. The full-duplex nature of this protocol allows multiple indications of erroneous data frames to be sent to a transmitter while immediately releasing to a destination any received frames containing no errors. The features of this protocol thus provide the capability for an intelligent application layer to resequence the frames at their destinations.

While the invention has been particularly shown and described with reference to preferred embodiments thereof, it will be understood by those skilled in the art that various changes in form and detail may be made therein without departing from the spirit and scope of the invention.

What I claim is:

1. A method of transmitting a plurality of data frames to an intelligent application layer, said intelligent application layer located at the receiving end of a communications link and capable of assembling said plurality of data frames into a block; comprising the steps of:
   assigning a sequential sequence number and a corresponding one bit transmit toggle value to each of said plurality of data frames by a transmitter;
   transmitting said data frames over said communication link to a receiver;
   receiving said data frames at said receiver and immediately directing said data frames to said intelligent application layer for assembly into said block using said sequential sequence number and said corresponding one bit transmit toggle value.

2. A method of transmitting a plurality of data frames as in claim 1, where the assigning of said sequential sequence number is done in radix rotation.

3. A method of transmitting a plurality of data frames as in claim 1, where the assigning of said sequential sequence number is done by repeatedly assigning numbers from zero to seven.

4. A method of transmitting a plurality of data frames as in claim 1, where said intelligent application layer maintains a list of unacknowledged data frames.

5. A method as in claim 1 further including the step of determining at said application layer if one of said plurality of data frames contains an error and requesting a retransmission of only the plurality of data frames containing said error.

6. A method of transmitting a plurality of data frames from a sender to a receiver over a communications link, comprising the steps of:
   assigning a sequential sequence number and a corresponding one bit toggle bit value to each one of said plurality of data frames at said sender;
   transmitting over said communications link said plurality of data frames to said receiver; and
   immediately releasing said plurality of data frames to a queue having therein an intelligent application layer for assembling said plurality of data frames into a block for additional processing using said sequential sequence number and said corresponding one bit toggle bit value.

7. A modified high-level data link protocol for transmitting a plurality of sequentially numbered data frames over a communication channel, said transmission protocol capable of conveying the presence of a plurality of data frames having errors within said plurality of sequentially numbered data frames to a receiver, comprising the steps of:
   assigning a sequential sequence number and a one bit toggle bit value to each of said plurality of data frames;
   transmitting said plurality of data frames to said receiver;
   immediately releasing said plurality of data frames to an application layer transmitted without error and requesting retransmission of only the data frames found to have errors by examining said sequential sequence number and said one bit toggle bit value.

8. A method of providing for the immediate release of a plurality of data frames transmitted over a communications link upon arrival at a receiver, said receiver capable of directing said data frames to one of a plurality of destination queues, comprising the steps of:
   receiving a plurality of data frames at said receiver;
   distributing said plurality of data frames immediately to one of said plurality of destination queues; and
   assembling said plurality of data frames into a block at one of said plurality of destination queues for transmission using a one bit toggle value and sequential sequence number transmitted with said data frames.

9. A method of providing for the immediate release of a plurality of data frames as recited in claim 8, wherein the assembling step includes assembling the plurality of data frames into a block at one of said plurality of destination queues for storage using a one bit toggle value and sequential sequence number transmitted with said data frames.

* * * * *